Jan. 18, 1927.

F. S. McCULLOUGH 1,615,093

HIGH VACUUM SPACE DISCHARGE DEVICE AND GAS ACCUMULATOR THEREFOR

Filed Sept. 17, 1923

INVENTOR
Frederick S. McCullough
by C. M. Clarke
atty.

Patented Jan. 18, 1927.

1,615,093

UNITED STATES PATENT OFFICE.

FREDERICK S. McCULLOUGH, OF WILKINSBURG, PENNSYLVANIA.

HIGH VACUUM SPACE DISCHARGE DEVICE AND GAS ACCUMULATOR THEREFOR.

Application filed September 17, 1923. Serial No. 663,144.

This invention relates to normally highly exhausted vessels, such as vacuum tubes or X-ray tubes, and particularly to the provision of a gas accumulator therefor.

During the process of manufacturing such tubes, the metal parts in the tube are heated to a relatively high temperature while the tube is still on the pump, in order to drive out the gases in the metal or on the surface thereof. The temperature to which the metals are raised at this time is far beyond the normal operating temperature of the tube, the plate being heated to a bright yellow or thereabout.

While some of the gas driven off will pass out the pump, some of the gas will be attracted to and adhere to the relatively cool glass walls of the vessel.

When the tube has been on the pump a sufficient time, and the temperature of the anode somewhat reduced, the vessel is then tipped off. During this process, the glass must be heated to the melting point, and consequently some of the gases lodged on the surface thereof are driven back into the tube, and as the tube is sealed, will not, of course, be carried off by the pump. Consequently, when the tube is placed in operation, if the anode becomes overheated from any cause, the minute quantity of gas in or on the anode will be thrown out with considerable force, producing a glow in the tube around the anode. If this condition maintains for a short time, the molecules of gas around the plate will be thrown out against the glass vessel, knocking loose other molecules of gas lodged on the glass, and thus break down the vacuum within the tube, that is, to use an expression of the art, cause it to become "soft".

The invention has for its object to provide a coating on that surface of the anode not exposed to the electron stream from the cathode, of a nature which will, even under high temperature conditions, absorb and retain gases.

The accompanying drawings illustrate my invention as applied to thermionic tubes.

Figure 1:
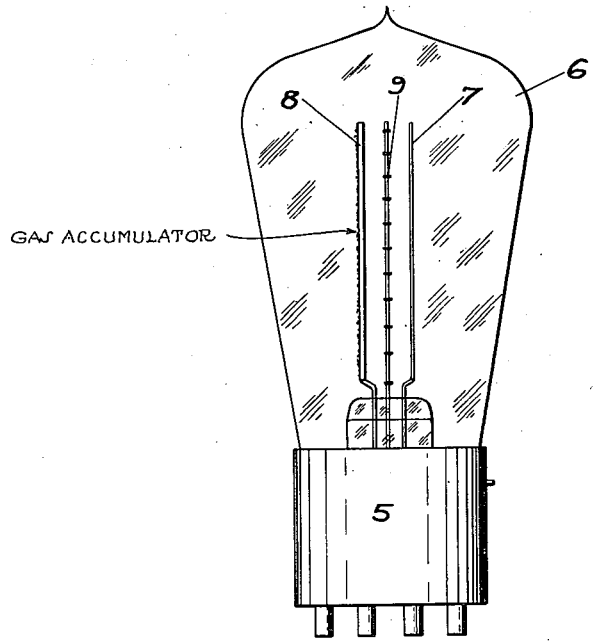
Figure 2:
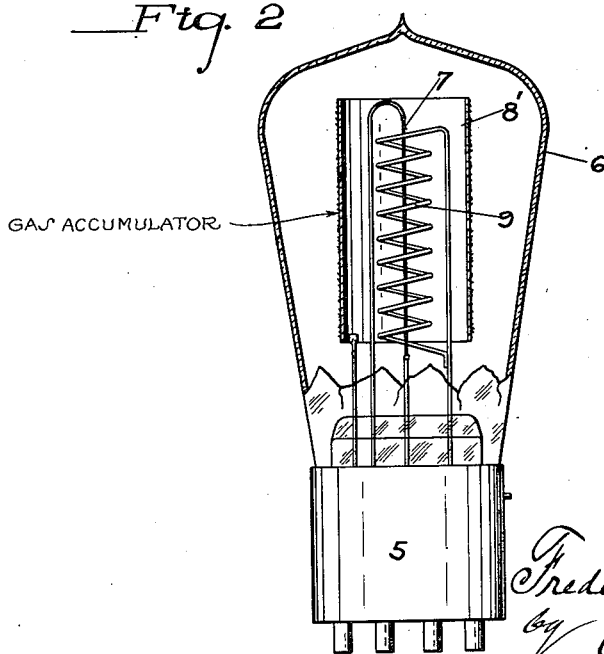

Fig. 1 designates a side view of a three-element vacuum tube, showing my invention applied to the anode, which is in the form of a rectangular plate; and Fig. 2 represents a vertical section through a three-element tube having a cylindrical anode, the gas accumulator being applied to the anode.

While I have shown two different forms of tubes, my invention is adapted for use with any high vacuum tube having an anode within the highly evacuated vessel.

In both figures, 5 designates a standard base, 6 is the glass envelope, and 17 is the filament or cathode. The anodes are designated 8 in both figures, the anode of the Fig. 1 construction being a rectangular plate, and that of the Fig. 2 construction being a cylinder. I have shown the invention as applied to tubes having a control member 9 ineterposed between the anode and the cathode, but do not restrict myself to tubes of this type.

Applied to the outer or exterior surface of the anode, that is, the surface not turned toward the cathode, is a coating of a suitable gas accumulating substance, preferably of low electron emissitivity and with a high temperature of volatilization, such as oxides of various kinds, or pure willow charcoal. Pure willow charcoal seems to be of such density when heated and cooled to efficiently absorb and retain the gas from the interior of the envelope. This coating is preferably composed of a substance whose volatilization point is above the volatilization point of the metal of the anode. As an example, an oxide of aluminum might be used, or, as above noted, a coating of willow charcoal would answer the purpose.

The oxide or accumulating substance, which is generally of a porous nature as compared with the metal of the anode, is, of course, applied to the anode before the tube is assembled. When the tube is pumped, the parts are heated far above the normal operating temperature for the tube, in the usual manner to de-gassify the metals as much as possible. When the tube is tipped off, the remaining gas in the tube, not lodged on the envelope, will be attracted by the coating on the plate. The coating, it has been found, will retain the gas even when the temperature of the anode is subsequently raised to the melting point.

Inasmuch as the coating, furthermore, is applied directly to the element of the tube which gives off the destructive gases during operation, and about which manifestations of gaseous conditions is normally first apparent, it will be seen that the coating will trap the hot gas particles and prevent them from being propelled against the interior of the envelope and strike the film of gas which is lodged upon the cooler surfaces, consequently preventing the loosening of other particles which, under continued conditions of overheat, would otherwise break down the vacuum of the tube.

It has been found that, when the coating is applied directly to the exterior of the anode in the manner described, a tube may be worked for long periods above normal operating temperatures with no apparent harm, it being possible to even raise the temperature to the melting point of the anode without the tube going soft and without the visible manifestation of gaseous conditions.

I claim as my invention:

1. A vacuum tube having an anode and a cathode, and a coating of charcoal on the entire part of that surface of the anode directed away from the cathode.

2. A vacuum tube having an anode and a cathode surrounded by a vessel, and an applied coating of gas accumulating material of a porous nature, which coating is only applied to that surface of the anode not directed toward the cathode but entirely covers said surface.

3. A vacuum tube including a vessel within which is an anode and a cathode, and a non-metallic gas accumulator of willow charcoal or the like interposed between the anode and the vessel and out of contact with the latter which prevents gas particles from being propelled against the walls of the vessel.

4. A vacuum tube having an electrode therein, and a gas accumulator of willow charcoal applied to said electrode, which accumulator is initially deposited on the electrode before the tube is assembled and of a material foreign to the material of the electrode.

5. A vacuum tube having a metallic electrode therein, and a gas accumulator applied to and completely covering the outer surface only of said electrode and having a volatilization temperature above the melting point of the electrode, the accumulator being relatively porous with respect to the electrode and of a material foreign to the material of the electrode.

6. In a vacuum tube having electrodes therein, a gas absorber of willow charcoal placed between the anode and those parts of the tube which are relatively cooler during the operation of the tube.

In testimony whereof I hereunto affix my signature.

FREDERICK S. McCULLOUGH.